US012496772B2

(12) United States Patent
Hikmet et al.

(10) Patent No.: US 12,496,772 B2
(45) Date of Patent: Dec. 16, 2025

(54) METHOD FOR INCLUDING VOIDS IN POLYMER FILAMENTS FOR FDM PRINTING

(71) Applicant: SIGNIFY HOLDING B.V., Eindhoven (NL)

(72) Inventors: Rifat Ata Mustafa Hikmet, Eindhoven (NL); Ties Van Bommel, Horst (NL); Stefan Willi Julius Gruhlke, Baesweiler (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 138 days.

(21) Appl. No.: 18/015,272

(22) PCT Filed: Jul. 8, 2021

(86) PCT No.: PCT/EP2021/069048
§ 371 (c)(1),
(2) Date: Jan. 9, 2023

(87) PCT Pub. No.: WO2022/017821
PCT Pub. Date: Jan. 27, 2022

(65) Prior Publication Data
US 2023/0302719 A1 Sep. 28, 2023

(30) Foreign Application Priority Data
Jul. 20, 2020 (EP) .................................... 20186634

(51) Int. Cl.
*B29C 64/118* (2017.01)
*B33Y 70/10* (2020.01)
(Continued)

(52) U.S. Cl.
CPC ............ *B29C 64/118* (2017.08); *B33Y 70/10* (2020.01); *B33Y 80/00* (2014.12); *B29K 2101/12* (2013.01);
(Continued)

(58) Field of Classification Search
CPC ....... B29C 64/118; B33Y 80/00; B33Y 70/10; B33Y 10/00; B29K 2101/12; B29K 2509/08; B29K 2995/0063; D01F 1/10
See application file for complete search history.

(56) References Cited

U.S. PATENT DOCUMENTS 10,254,499 B1    4/2019  Cohen et al.
2014/0141166 A1  5/2014  Rodgers
(Continued)

FOREIGN PATENT DOCUMENTS

CN    105645840 A  *  6/2016  ............. B33Y 70/00
CN    110831742 A      2/2020
(Continued)

OTHER PUBLICATIONS

Translation of CN-105645840-A (Year: 2016), Chen et al., Jun. 8, 2016.*

*Primary Examiner* — Mathieu D Vargot (57) ABSTRACT

The invention provides a method for producing a 3D item by means of fused deposition modelling, the method comprising a 3D printing stage comprising layer-wise depositing 3D printable material, to provide the 3D item comprising 3D printed material, wherein the 3D item comprises layers of 3D printed material, wherein the 3D printable material comprises thermoplastic material, wherein during at least part of the 3D printing stage the 3D printable material further comprises porous inorganic particles embedded in the thermoplastic material, wherein the porosity of the inorganic particles is in the range 5-60 vol. %, and wherein the inorganic particles (410) have an open porosity. The (Continued)

invention also comprises the product resulting from above method.

8 Claims, 6 Drawing Sheets

(51) Int. Cl.
*B33Y 80/00* (2015.01)
*B29K 101/12* (2006.01)
*B29K 509/08* (2006.01)
*B33Y 10/00* (2015.01)

(52) U.S. Cl.
CPC .. *B29K 2509/08* (2013.01); *B29K 2995/0063* (2013.01); *B33Y 10/00* (2014.12)

(56) References Cited

U.S. PATENT DOCUMENTS

2017/0275196 A1  9/2017  Ahmed
2018/0264688 A1  9/2018  Jaker et al.

FOREIGN PATENT DOCUMENTS

| WO | 2017040893 A1 | 3/2017 |
| WO | 2018144141 A1 | 8/2018 |
| WO | 2018210602 A1 | 11/2018 |
| WO | 2019133651 A1 | 7/2019 |

* cited by examiner

METHOD FOR INCLUDING VOIDS IN POLYMER FILAMENTS FOR FDM PRINTING

CROSS-REFERENCE TO PRIOR APPLICATIONS

This application is the U.S. National Phase application under 35 U.S.C. § 371 of International Application No. PCT/EP2021/069048, filed on Jul. 8, 2021, which claims the benefit of European Patent Application No. 20186634.0, filed on Jul. 20, 2020. These applications are hereby incorporated by reference herein.

FIELD OF THE INVENTION

The invention relates to a method for manufacturing a 3D (printed) item. The invention also relates to the 3D (printed) item obtainable with such method. Further, the invention relates to a lighting device including such 3D (printed) item.

BACKGROUND OF THE INVENTION

The use of a thermoplastic polymer comprising a particulate filler for preparing 3D articles is known in the art. WO2017/040893, for instance, describes a powder composition, wherein the powder composition comprises a plurality of thermoplastic particles characterized by a bimodal particle size distribution, and wherein the powder composition may further comprise a particulate filler, antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent, fragrance, fiber, or a combination comprising at least one of the foregoing, preferably a colorant or a metal particulate. This document further describes a method of preparing a three-dimensional article, the method comprising powder bed fusing the powder composition to form a three-dimensional article.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals, and polymers. 3D printing can also be used in producing molds which can then be used for replicating objects.

For the purpose of making molds, the use of polyjet technique has been suggested. This technique makes use of layer by layer deposition of photo-polymerizable material which is cured after each deposition to form a solid structure. While this technique produces smooth surfaces the photo curable materials are not very stable, and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

Hence, in a first aspect the invention provides a method for producing a 3D item ("item" or "3D printed item") by means of fused deposition modelling. Especially, the method may comprise a 3D printing stage comprising layer-wise depositing 3D printable material, to provide the 3D item. The 3D item (thereby) comprises 3D printed material. Deposition may especially be done on a receiver item. The 3D item especially comprises layers of 3D printed material. Especially, the 3D printable material comprises thermoplastic material. Especially, during at least part of the 3D printing stage, the 3D printable material further comprises porous inorganic particles embedded in the thermoplastic material. In embodiments, the porosity of the inorganic particles is in the range 5-60 vol. %.

The term "porosity" refers to the state of being porous. In other words, it refers to a state wherein a material has pores (also referred to as or openings, or cavities, or interstices). In the present invention, the porous material is a particulate material, and a distinction is made between two types of porosity: (i) closed porosity and (ii) open porosity. For particles with a closed porosity, the pores are located in the interior of the particles, and they are not accessible (or open) from the exterior. For particles with an open porosity, at least some of the pores are located so close to the surface of the particles that they are open towards the exterior. The total amount of pore space that is accessible from the surface may be referred to as the accessible pore volume or the accessible pore space. For particles with an open porosity, the accessible pore volume is greater than zero.

The pores of a porous material can be interconnected to form an open cell morphology, or they can be non-interconnected to form a closed cell morphology.

An open porosity can be obtained in various ways during glass or ceramic formation. For example, it is possible to take micro hollow spheres and sinter them. It is also possible to use sacrificial micro spheres of a polymer and add it to the precursor. After a sintering step, a closed porosity is obtained. It is also possible to use blowing agents to produce a closed cell morphology.

Porous glass is commonly prepared by one of the following processes: (i) through metastable phase separation in borosilicate glasses (such as in the system $SiO_2$—$B_2O_3$—$Na_2O$), followed by liquid extraction of one of the formed phases, (ii) through a sol-gel process, or (iii) by sintering glass powder. During these processes an open cell morphology can occur.

It is also possible to have a porous material with a closed shell. In other words, a porous interior and a non-porous shell made of a solid material.

For the purpose of the invention, and as will be explained hereinafter, the particles that are comprised in the thermoplastic material should have an open porosity to allow the controlled introduction of voids in the printable material (e.g. the filament) and/or the printed material. The presence of moisture on the surfaces of the porous particles may help in obtaining larger pores in the printable material and/or the printed material.

Hence, in specific embodiments the invention provides a method for producing a 3D item by means of fused deposition modelling, the method comprising a 3D printing stage comprising layer-wise depositing 3D printable material, to provide the 3D item comprising 3D printed material, wherein the 3D item comprises layers of 3D printed material, wherein the 3D printable material comprises thermoplastic material, wherein during at least part of the 3D printing stage the 3D printable material further comprises porous inorganic particles embedded in the thermoplastic material, wherein the porosity of the inorganic particles is in the range 5-60 vol. %, and wherein the inorganic particles have an open porosity.

In this way, it may be possible to prepare porous 3D printed items by means of FDM, whilst reducing the amount of material used, thus reducing the weight of the printed objects whilst maintaining the structural integrity of the items. This is achieved by the controlled introduction of voids in the printed material.

The controlled introduction of voids in the printed material requires embedded particles with an open porosity. The gas or liquid (for example air or nitrogen) that is located inside the pores whilst being encapsulated within the printable material expands during extrusion and therefore produces larger voids inside filaments. As the voids remain located around the embedded inorganic particles, the mechanical integrity of the filaments is maintained. Since the voids remain located around the embedded inorganic particles, the position of the voids can be controlled by controlling the position of the inorganic particles. As the size of the voids is depending on the size of the pores, this can also be controlled by the type of inorganic particles used. This allows a relatively simple 3D printing method but also adds to the controllability of local material properties of the 3D printed item for reducing the weight of the object.

It is therefore also desirable to provide a filament as such, which may especially be used in the herein described method. Therefore, in an aspect of invention the invention further provides 3D printable material, especially a filament comprising 3D printable material, wherein the 3D printable material comprises a (host) polymer, especially a thermoplastic material, and inorganic porous particles (embedded therein). Such 3D printable material, especially such filament, can be extruded (with a 3D printer, such as herein described in embodiments).

In embodiments, the porosity of the inorganic particles is in the range 5-60 vol. %, especially in the range 10-50 vol. %, more especially in the range 10-40 vol. %, such as less than 40 vol. %, more especially equal to or less than 35 vol. %. The porosity determines the amount of gas or liquid that can expand. Particles with low porosity cannot produce large enough voids and if the porosity of the particles is too high, then the particles may be mechanically too weak, and they may break up into small pieces. The porosity may be determined via a direct method, such as especially determining the bulk volume of the porous sample, and then determining the volume of the skeletal material with no pores (pore volume=total volume−material volume). Alternatively, the porosity may be determined via an optical method, such as especially determining the area of the material versus the area of the pores visible under the microscope. The "areal" and "volumetric" porosities are essentially equal for porous media with random structure. Especially, an optical method may be applied.

Similarly, the pore size may at least partly determine the amount of gas or liquid that can expand and may also at least partly determine the strength of the particles. In embodiments, the inorganic particles have an average pore size in the range of 10-100 µm. The pore size may be determined via an optical method, such as especially measuring the diameter of the pores visible under the microscope. Alternatively, the porosity may be determined using especially mercury pressure porosimetry. Alternatively, especially X-ray refraction may be applied.

As mentioned above, the voids may remain located around the embedded porous inorganic particles and therefore the shape of the particles may affect the distribution of the voids in the filament. The shape of the particles may also influence the ease of printing. Dependent upon the sizes, elongated particles may be more cumbersome to embed in the printable material. In embodiments, the inorganic particles may have a length (L1), a width (L2) and a height (L3), wherein in specific embodiments the aspect ratio AR1=L1/L2 may be in the range of $0.5 \leq AR1 \leq 2$. Alternatively, or additionally, in embodiments the aspect ratio AR2=L1/L3 may be in the range of $0.5 \leq AR2 \leq 2$. Yet further, in embodiments the aspect ratio AR3=L2/L3 may be in the range of $0.5 \leq AR2 \leq 2$. Yet further, in embodiments the inorganic particles may have a length (L1) in the range from 10-500 µm, more especially in the range from 30-300 µm, most especially in the range from 50-150 µm. Hence, especially in embodiments the inorganic particles may have a length (L1) in the range from 10-500 µm, a width (L2) and a height (L3), wherein the aspect ratio AR1=L1/L2 is in the range of $0.5 \leq AR1 \leq 2$, wherein the aspect ratio AR2=L1/L3 is in the range of $0.5 \leq AR2 \leq 2$, and wherein the aspect ratio AR3=L2/L3 is in the range of $0.5 \leq AR2 \leq 2$.

In embodiments, the concentration of the porous inorganic particles may be in the range 5-30 vol. %, especially in the range 10-30 vol. %. Wherein the concentration is calculated as the total volume of the porous inorganic particles divided by the sum of the total volume of the porous inorganic particles and the volume of the thermoplastic material in which the particles are embedded and multiplied by 100%. If the concentration is too low, then the amount of void formation may be too low. If the particle concentration is too high, the voids may merge, and the structure may collapse. During processing, the polymeric material may essentially not enter the pores.

Many inorganic materials may be suitable for the porous inorganic particles, especially metal oxide particles appear to be favorable. In embodiments, the porous inorganic particles comprise porous glass particles. Herein, the term "metal oxide" may refer to MO based systems, but also to borates, silicates, phosphates, etc.

Besides the porous inorganic particles, the 3D printable material may also comprise other additives and/or particles. In embodiments, stabilizers, light absorbers, dye, reflective particles, etc. may be included. This is described in more detail below.

In embodiments, the porous inorganic particles comprise core-shell particles, comprising a hollow core and a porous shell. This may result in a mass reduction of the particles and thus in reducing the weight of the printed item. In embodiments, wherein the hollow core is made accessible by the pores, the amount of gas or liquid that can be incorporated within a particle can be increased and thus increasing the volume of the voids that a single particle can introduce into the printable material. In other embodiments, the hollow core may not be in fluid connection with the pores (e.g. due to an intermediate shell defining the hollow core and supporting the porous shell, though other embodiments may also be possible).

In embodiments, the porous inorganic particles comprise core-shell particles, comprising a hollow core and a massive shell. This may result in a mass reduction of the particles and thus in reducing the weight of the printed item.

For the ease of production, it is convenient if the porous inorganic particles do not quickly accumulate at the top (float) or bottom (sink) of the thermoplastic material but remain homogeneously mixed during the production of the filament. Therefore, in embodiments the densities of the particles and the thermoplastic material may be adapted to each other. In embodiments, the porous inorganic particles have a first density n1, the thermoplastic material has a second density n2, wherein in specific embodiments $0.8 \leq n1/n2 \leq 1.2$, more especially wherein $0.9 \leq n1/n2 \leq 1.1$.

In embodiments, the printable material may comprise multiple types of porous inorganic particles regarding one or more of (i) material, (ii) average particle size, (iii) particle size distribution, (iv) average pore size, (v) pore size distribution, and (v) aspect ratio. In this way, mechanical properties can be controlled more precisely. In a specific embodiment, one type of particles is used in a first part of the filament and another type of particles is used in a second part of the filament, providing the possibility to locally control the mechanical properties (e.g. density) within a printed object.

In specific embodiments, at least 5 layers, like at least 8 layers, such as at least 10 layers may comprise the herein described porous particles. In yet other embodiments, layers with these particles and layers without these particles may alternate each other. In yet further embodiments, sets of at least two layers with these particles and sets of at least two layers without these particles may alternate each other.

Before incorporating the porous inorganic particles in the thermoplastic material, the pores can be filled with a gas or liquid. As different materials have different expansion coefficients, using different filling materials, may result in different void dimensions and thus also different material densities in the printed item. In embodiments, the voids are filled with air or with nitrogen; especially air may be applied. Especially for further cross-linking of the thermoplastic material, a non-air environment may be desirable. In embodiments, an essentially pure gas is used such as nitrogen, oxygen or helium or mixtures thereof. In embodiments, the water-content is less than or equal to 100 ppm, such as at maximum 50 ppm, like at maximum 20 ppm, such as in specific embodiments at maximum 5 ppm.

As mentioned above, the position of the porous inorganic particles may determine the position of where the voids are formed. Therefore, controlling the position of the particles may be useful. For instance, in specific embodiments core-shell filaments may be used wherein the porous inorganic particles are incorporated in the core of the filament and a lower concentration (e.g. no particles) are included in the shell.

Hence, in yet a further aspect of the invention, the invention also provides core-shell filaments wherein the porous inorganic particles are incorporated in the core of the filament and a lower concentration, such as at least 50% lower, e.g. no porous inorganic particles, may be included in the shell. This may provide a high level of control over the position of the particles and thus voids and may lead to better mechanical integrity of the printed item. In specific embodiments, the porous inorganic particles have a first concentration c1 in the core and a second concentration c2 in the shell, wherein $c2/c1 \leq 0.5$, especially wherein $c2/c1 \leq 0.25$, more especially wherein $c2/c1 \leq 0.1$.

In embodiments, the thermoplastic material per se (i.e. without taking into account the porous inorganic particles) may be light transmissive, though this is not necessarily the case. In embodiments, the refractive index of the thermoplastic material RI1 and of the inorganic particles RI2 may be essentially the same, such as $0.85 \leq RI1/RI2 \leq 1.15$. In this way, the 3D printable material (and the 3D printed material) may be transmissive for light. In embodiments, the porous inorganic particles may be light transmissive, though this is not necessarily the case. Especially, the porous inorganic particles may be translucent, though this is not necessarily the case.

Hence, in embodiments the 3D printable material (and the 3D printed material) may thus comprise, or even essentially be light transmissive material.

The transmission of the light transmissive material for one or more wavelengths (in the visible) may be at least 80%/cm, such as at least 90%/cm, even more especially at least 95%/cm, such as at least 98%/cm, such as at least 99%/cm. This implies that e.g. a 1 $cm^3$ cubic shaped piece of light transmissive material, under perpendicular irradiation of radiation having a selected wavelength in the visible, will have a transmission of at least 95%.

Herein, values for transmission especially refer to transmission without taking into account Fresnel losses at interfaces (with e.g. air). Hence, the term "transmission" especially refers to the internal transmission. The internal transmission may e.g. be determined by measuring the transmission of two or more bodies having a different width over which the transmission is measured. Then, based on such measurements the contribution of Fresnel reflection losses and (consequently) the internal transmission can be determined. Hence, especially, the values for transmission indicated herein, disregard Fresnel losses.

The term "wavelength(s) of interest" may especially refer to one or more wavelengths in the visible.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light. Herein, the term "visible light" especially relates to light having a wavelength selected from the range of 380-780 nm.

In embodiments, the thermoplastic material per se (i.e. without taking into account the porous inorganic particles) may be light reflective, though this is not necessarily the case. This may be achieved by incorporation of reflective particles into the thermoplastic material and/or by a colorant (e.g. white).

In embodiments, the porous inorganic particles may be light reflective, and the thermoplastic material is light transmissive, though this is not necessarily the case.

The reflection of the printed light reflective material for one or more wavelengths (in the visible) may be at least 80%, such as at least 90%, even more especially at least 95%, such as at least 98%, such as at least 99%.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material. Essentially, the materials are the same material, as the thermoplastic material upstream of the printer head, downstream of the printer head, and when deposited, is essentially the same material.

Herein, the term "3D printable material" may also be indicated as "printable material. The term "polymeric material" may in embodiments refer to a blend of different polymers but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention thus provides a method comprising providing a filament of 3D printable material and printing during a printing stage said 3D printable material on a substrate, to provide said 3D item.

Hence, in another aspect the invention provides a filament for producing a 3D item by means of fused deposition modelling. Especially, the filament may comprise 3D printable material. Especially, the 3D printable material comprises components, wherein the components at least comprise (i) thermoplastic material and (ii) porous inorganic particles. Especially, in at least part of the filament the 3D printable material comprises the porous inorganic particles embedded in the thermoplastic material. In embodiments, the porosity of the inorganic particles is in the range 5-60 vol. %. Especially, the concentration of the porous inorganic particles is in the range 10-30 vol. % relative to the 3D printable material. In embodiments, the filament has a material density $n_f$, wherein the filament has a theoretical material density $n_{fc}$, defined on the basis of the densities of the components of the filament, wherein in specific embodiments $0.6 \leq n_f/n_{fc} \leq 1$. The filament as described herein may be used in the method described herein.

Hence, in specific embodiments the invention provides a filament for producing a 3D item by means of fused deposition modelling, the filament comprising 3D printable material, wherein the 3D printable material comprises components, wherein the components at least comprise (i) thermoplastic material and (ii) porous inorganic particles; wherein in at least part of the filament the 3D printable material comprises the porous inorganic particles embedded in the thermoplastic material, wherein the porosity of the inorganic particles is in the range 5-60 vol. %, wherein the inorganic particles (410) have an open porosity, wherein the concentration of the porous inorganic particles is in the range 10-30 vol. % relative to the 3D printable material, wherein the filament has a material density $n_f$, wherein the filament has a theoretical material density $n_{fc}$, defined on the basis of the densities of the components of the filament, wherein $0.6 \leq n_f/n_{fc} \leq 1$.

In this way, it may be possible to prepare porous 3D printed items by means of FDM, whilst starting from a previously prepared filament.

The gas or liquid (for example air or nitrogen) that is located inside the pores of the inorganic particles whilst being encapsulated within the printable material expands during heating. Therefore, the porosity of the filament may depend on the temperature used for the preparation of the filament. When the filament is prepared at a temperature lower than the printing temperature, the voids in the filament may be smaller than the voids in the 3D printed item or no voids may be present yet in the filament. In embodiments, the filament may be made at a first temperature T1. Further, the 3D printing method may comprise 3D printing the filament, wherein the filament is heating in the printer nozzle at a second temperature T2. In embodiments, T2>T1. Hence, in embodiments during printing porosity may be further increased. In embodiments T2−T1≥5° C., especially T2−T1≥10° C., more especially T2−T1≥20° C. Alternatively, the filament may be prepared at the same temperature or a higher temperature than the printing, thus $T1 \geq T2$. Therefore, the density of the printed item $n_m$ may be the identical to or lower than the density of the filament $n_f$, thus $n_m \leq n_f$.

In a specific embodiment, the filament comprises a plurality of components at least comprising the thermoplastic material and porous inorganic particles, wherein, the filament has a material density $n_f$, wherein the filament has a theoretical material density $n_{fc}$, defined on the basis of the densities of the components of the filament, wherein $0.6 \leq n_f/n_{fc} \leq 1$, especially wherein $0.7 \leq n_f/n_{fc} \leq 1$. Amongst others due to the voids, the density may be lower, and thus the weight of the 3D item may be reduced.

As indicated above, in embodiments, the porosity of the inorganic particles is in the range 5-60 vol. %, especially in the range 10-50 vol. %, more especially in the range 10-40 vol. %, such as less than 40 vol. %, more especially less than 35 vol. %.

As indicated above, in embodiments the inorganic particles have an average pore size in the range of 10-100 µm.

In embodiments, the inorganic particles have a length (L1) in the range from 1-500 µm, more especially in the range from 5-300 µm, most especially in the range from 10-250 µm, a width (L2) and a height (L3), wherein the aspect ratio $AR1=L1/L2$ is in the range of $0.5 \leq AR1 \leq 2$, wherein the aspect ratio $AR2-L1/L3$ is in the range of $0.5 \leq AR2 \leq 2$, and wherein the aspect ratio $AR3=L2/L3$ is in the range of $0.5 \leq AR2 \leq 2$.

In embodiments, the concentration of the porous inorganic particles is in the range 5-30 vol. %, especially in the range 10-30 vol. %.

Many inorganic materials are suitable for the porous inorganic particles, especially metal oxide particles seem favorable. In embodiments, the porous inorganic particles comprise porous glass particles.

In embodiments, the porous inorganic particles comprise core-shell particles, comprising a hollow core and a porous shell.

In embodiments, the porous inorganic particles comprise core-shell particles, comprising a hollow core and a massive shell.

In embodiments, the printed material comprises multiple types of porous inorganic particles regarding material, average particle size, particle size distribution, average pore size, pore size distribution, and/or aspect ratio. In a specific embodiment, one type of particles is used in a first part of the printed item and another type of particles is used in a second part of the printed item.

As mentioned above, in embodiments, core-shell filaments are used wherein the porous inorganic particles are incorporated in the core of the filament and a lower concentration (e.g. no particles) are included in the shell. In a specific embodiment, the porous inorganic particles have a first concentration c1 in the core and a second concentration c2 in the shell, wherein $c2/c1 \leq 0.5$, especially wherein $c2/c1 \leq 0.25$, more especially wherein $c2/c1 \leq 0.1$.

In embodiments, the thermoplastic material per se (i.e. without taking into account the porous inorganic particles) may be light transmissive, though this is not necessarily the case.

In embodiments, the porous inorganic particles may be light transmissive, though this is not necessarily the case. Especially, the porous inorganic particles may be translucent, though this is not necessarily the case.

The transmission of the light transmissive material for one or more wavelengths (in the visible) may be at least 80%/cm, such as at least 90%/cm, even more especially at least 95%/cm, such as at least 98%/cm, such as at least 99%/cm. This implies that e.g. a 1 cm³ cubic shaped piece of light transmissive material, under perpendicular irradiation of radiation having a selected wavelength in the visible, will have a transmission of at least 95%.

In embodiments, the thermoplastic material per se (i.e. without taking into account the porous inorganic particles) may be light reflective, though this is not necessarily the case.

In embodiments, the porous inorganic particles may be light reflective, though this is not necessarily the case.

The reflection of the light reflective material for one or more wavelengths (in the visible) may be at least 80%, such as at least 90%, even more especially at least 95%, such as at least 98%, such as at least 99%.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc. Optionally, the 3D printable material comprises a 3D printable material selected from the group consisting of Urea formaldehyde, Polyester resin, Epoxy resin, Melamine formaldehyde, thermoplastic elastomer, etc. Optionally, the 3D printable material comprises a 3D printable material selected from the group consisting of a polysulfone. Elastomers, especially thermoplastic elastomers, are especially interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl) acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl) methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl) acrylates and poly($C_{1-6}$ alkyl) methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the 3D printable material (and the 3D printed material) comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polyethylene terephthalate (PET), acrylonitrile butadiene styrene (ABS), poly(methyl methacrylate) (PMMA), polystyrene (PS), and styrene acrylic copolymers (SMMA).

The term 3D printable material is further also elucidated below, but especially refers to a thermoplastic material, optionally including additives, to a volume percentage of at maximum about 60%, especially at maximum about 30 vol. %, such as at maximum 20 vol. % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture is especially not larger than 60 vol. %, relative to the total volume of the printable material (including the (anisotropically conductive) particles) especially in applications for reducing thermal expansion coefficient. For optical and surface related effect number of particles in the total mixture is equal to or less than 20 vol. %, such as up to 10 vol. %, relative to the total volume of the printable material (including the particles). Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprise particulate additives.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Layer by layer printable material is deposited, by which the 3D printed item is generated (during the printing stage). The 3D printed item may show a characteristic ribbed structure (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one or more post processing actions may be executed after removing the printed item from the receiver item. Post processing may include e.g. one or more of polishing, coating, adding a functional component, cross-linking, etc. Post-processing may include smoothening the ribbed structures, which may lead to an essentially smooth surface. Post-processing may include cross-linking of the thermoplastic material. This may result in fewer or no thermoplastic properties of the material.

Further, the invention relates to a software product that can be used to execute the method described herein. Therefore, in yet a further aspect the invention also provides a computer program product, when running on a computer which is functionally coupled to or comprised by a fused deposition modeling 3D printer, is capable of bringing about the method as described herein.

Hence, in an aspect the invention (thus) provides a software product, which, when running on a computer is capable of bringing about (one or more embodiments of) the method (for producing a 3D item by means of fused deposition modelling) as described herein.

The herein described method provides 3D printed items. Hence, the invention also provides in a further aspect a 3D printed item obtainable with the herein described method. In a further aspect a 3D printed item obtainable with the herein described method is provided.

Especially, the invention provides a 3D item comprising 3D printed material. As indicated above, the 3D item comprises a plurality of layers of 3D printed material. Further, especially the 3D printed material comprises porous inorganic particles. As indicated above, the 3D printed material comprises thermoplastic material. Especially at least part of the 3D printed material further comprises porous inorganic particles embedded in the thermoplastic material. In embodiments, the porosity of the inorganic particles is in the range 5-60 vol. %. Hence, especially the invention provides in embodiments a 3D item comprising 3D printed material, wherein the 3D item comprises a plurality of layers of 3D printed material, wherein the 3D printed material comprises thermoplastic material, wherein at least part of the 3D printed material further comprises porous inorganic particles embedded in the thermoplastic material, wherein the porosity of the inorganic particles is in the range 5-60 vol %, and wherein the inorganic particles (410) have an open porosity.

The 3D printed item may comprise a plurality of layers on top of each other, i.e. stacked layers. The width (thickness) and height of (individually 3D printed) layers may e.g. in embodiments be selected from the range of 100-5000 μm, such as 200-2500 μm, with the height in general being smaller than the width. For instance, the ratio of height and width may be equal to or smaller than 0.8, such as equal to or smaller than 0.6.

Layers may be core-shell layers or may consist of a single material. Within a layer, there may also be a change in composition, for instance when a core-shell printing process was applied and during the printing process it was changed from printing a first material (and not printing a second material) to printing a second material (and not printing the first material).

At least part of the 3D printed item may include a coating.

Some specific embodiments in relation to the 3D printed item have already been elucidated above when discussing the method. Below, some specific embodiments in relation to the 3D printed item are discussed in more detail.

As indicated above, in embodiments, the porosity of the inorganic particles is in the range 5-60 vol. %, especially in the range 10-50 vol. %, more especially in the range 10-40 vol. %, such as less than 40 vol. %, more especially less than 35 vol. %.

As indicated above, in embodiments the inorganic particles have an average pore size in the range of 10-100 μm.

In embodiments, the inorganic particles have a length (L1) in the range from 1-500 μm, more especially in the range from 5-300 μm, most especially in the range from 10-250 μm, a width (L2) and a height (L3), wherein the aspect ratio AR1=L1/L2 is in the range of $0.5 \leq AR1 \leq 2$, wherein the aspect ratio AR2=L1/L3 is in the range of $0.5 \leq AR2 \leq 2$, and wherein the aspect ratio AR3=L2/L3 is in the range of $0.5 \leq AR2 \leq 2$.

In embodiments, the concentration of the porous inorganic particles is in the range 5-30 vol. %, especially in the range 10-30 vol. %.

Many inorganic materials are suitable for the porous inorganic particles, especially metal oxide particles seem favorable. In embodiments, the porous inorganic particles comprise porous glass particles.

In embodiments, the porous inorganic particles comprise core-shell particles, comprising a hollow core and a porous shell.

In embodiments, the porous inorganic particles comprise core-shell particles, comprising a hollow core and a massive shell.

In embodiments, the printed material comprises multiple types of porous inorganic particles regarding material, average particle size, particle size distribution, average pore size, pore size distribution, and/or aspect ratio. In a specific embodiment, one type of particles is used in a first part of the printed item and another type of particles is used in a second part of the printed item.

As mentioned above, in embodiments, core-shell filaments are used wherein the porous inorganic particles are incorporated in the core of the filament and a lower concentration (e.g. no particles) are included in the shell. In a specific embodiment, the porous inorganic particles have a first concentration c1 in the core and a second concentration c2 in the shell, wherein $c2/c1 \leq 0.5$, especially wherein $c2/c1 \leq 0.25$, more especially wherein $c2/c1 \leq 0.1$.

In specific embodiments, the 3D printed item comprises at least 5 layers, like at least 8 layers, such as at least 10 layers that comprise the herein described porous particles. In yet other embodiments, layers with these particles and layers without these particles may alternate each other. In yet further embodiments, sets of at least two layers with these particles and sets of at least two layers without these particles may alternate each other.

In specific embodiments, the cross sectional area of the 3D printed item comprising at least two, such as at least five, layer axes Ax is larger than or equal to 5 cm$^2$, such as equal to or larger than 25 cm$^2$.

In embodiments, the thermoplastic material per se (i.e. without taking into account the porous inorganic particles) may be light transmissive, though this is not necessarily the case.

In embodiments, the porous inorganic particles may be light transmissive, though this is not necessarily the case. Especially, the porous inorganic particles may be translucent, though this is not necessarily the case.

The transmission of the light transmissive material for one or more wavelengths (in the visible) may be at least 80%/cm, such as at least 90%/cm, even more especially at least 95%/cm, such as at least 98%/cm, such as at least 99%/cm. This implies that e.g. a 1 cm$^3$ cubic shaped piece of light transmissive material, under perpendicular irradiation of radiation having a selected wavelength in the visible, will have a transmission of at least 95%.

In embodiments, the thermoplastic material per se (i.e. without taking into account the porous inorganic particles) may be light reflective, though this is not necessarily the case.

In embodiments, the porous inorganic particles may be light reflective, though this is not necessarily the case.

The reflection of the light reflective material for one or more wavelengths (in the visible) may be at least 80%, such as at least 90%, even more especially at least 95%, such as at least 98%, such as at least 99%.

In a specific embodiment, the 3D item comprises a plurality of components at least comprising the thermoplastic material and porous inorganic particles, wherein printed material has a material density $n_m$, wherein the printed material has a theoretical material density $n_{mc}$, defined on the basis of the densities of the components of the 3D printed material, wherein $0.6 \leq n_m/n_{mc} \leq 0.95$, especially wherein $0.7 \leq n_m/n_{mc} \leq 0.9$. Amongst others due to the voids, the density may be lower, and thus the weight of the 3D item may be reduced.

The (with the herein described method) obtained 3D printed item may be functional per se. For instance, the 3D printed item may be a lens, a collimator, a reflector, etc. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light transmissive element, an optical filter, etc. The term optical component may also refer to a light source (like a LED). The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively, or additionally, the functional component may comprise a thermal component (e.g. configured to cool or to heat an electrical component). Hence, the functional component may be configured to generate heat or to scavenge heat, etc.

As indicated above, the 3D printed item maybe used for different purposes. Amongst others, the 3D printed item maybe used in lighting. Hence, in yet a further aspect the invention also provides a lighting device comprising the 3D item as defined herein. In a specific aspect the invention provides a lighting system comprising (a) a light source configured to provide (visible) light source light and (b) the 3D item as defined herein, wherein 3D item may be configured as one or more of (i) at least part of a housing, (ii) at least part of a wall of a lighting chamber, and (iii) a functional component, wherein the functional component may be selected from the group consisting of an optical component, a support, an electrically insulating component, an electrically conductive component, a thermally insulating component, and a thermally conductive component. Hence, in specific embodiments the 3D item may be configured as one or more of (i) at least part of a lighting device housing, (ii) at least part of a wall of a lighting chamber, and (iii) an optical element. As a relative smooth surface may be provided, the 3D printed item may be used as mirror or lens, etc. In embodiments, the 3D item may be configured as shade. A device or system may comprise a plurality of different 3D printed items, having different functionalities. Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material as indicated above.

The printer nozzle may include a single opening. In other embodiments, the printer nozzle may be of the core-shell type, having two (or more) openings. The term "printer head" may also refer to a plurality of (different) printer heads; hence, the term "printer nozzle" may also refer to a plurality of (different) printer nozzles.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, as indicated above.

Especially, the 3D printer comprises a controller (or is functionally coupled to a controller) that is configured to execute in a controlling mode (or "operation mode") the method as described herein. Instead of the term "controller" also the term "control system" (see e.g. above) may be applied.

The term "controlling", and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc., Beyond that, the term "controlling", and similar terms may additionally include monitoring. Hence, the term "controlling", and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or iPhone, a tablet, etc. The device is thus not necessarily coupled to the lighting system but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
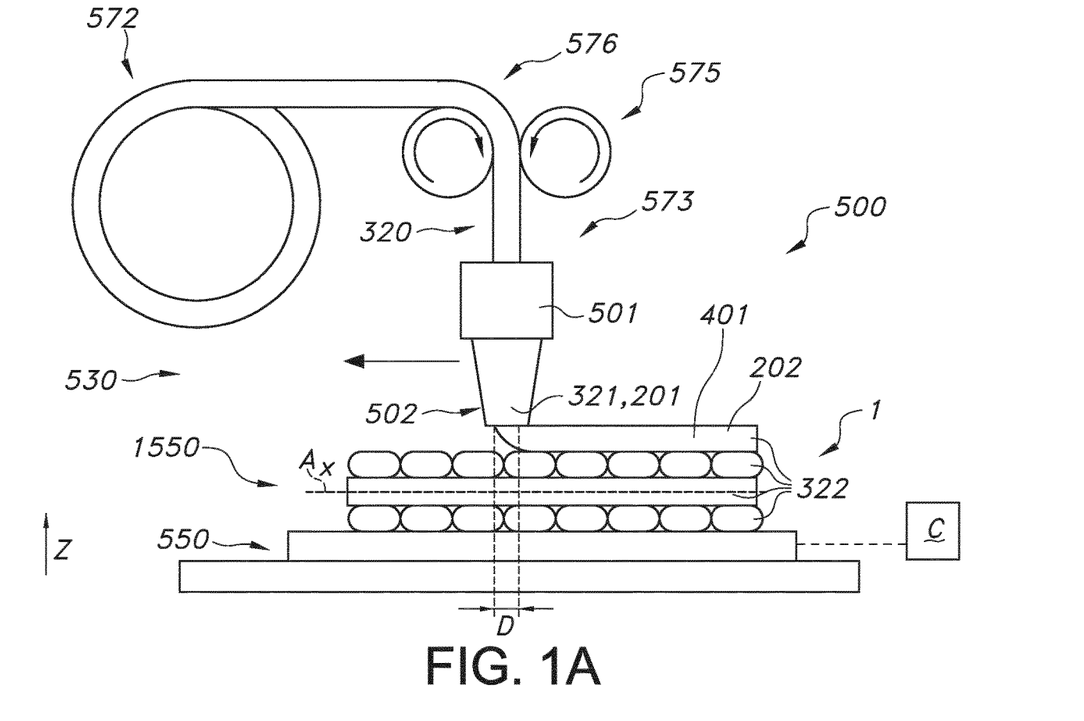
FIGS. 1a-1c schematically depict some general aspects of the 3D printer and of an embodiment of 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as an FDM 3D printer head is schematically depicted. Reference 501 indicates the printer head. The 3D printer of the present invention may especially include a plurality of printer heads (see below). Reference 502 indicates a printer nozzle. The 3D printer of the present invention may especially include a plurality of printer nozzles, though other embodiments are also possible. Reference 320 indicates a filament of printable 3D printable material (such as indicated above). For the sake of clarity, not all features of the 3D printer have been depicted, only those that are of especial relevance for the present invention (see further also below). Reference 321 indicates extrudate (of 3D printable material 201).

The 3D printer 500 is configured to generate a 3D item 1 by layer-wise depositing on a receiver item 550, which may in embodiments at least temporarily be cooled, a plurality of layers 322 wherein each layer 322 comprises 3D printable material 201, such as having a melting point $T_m$. The 3D printable material 201 may be deposited on a substrate 1550 (during the printing stage). By deposition, the 3D printable material 201 has become 3D printed material 202. 3D printable material 201 escaping from the nozzle 502 is also indicated as extrudate 321. Reference 401 indicates thermoplastic material.

The 3D printer 500 may be configured to heat the filament 320 material upstream of the printer nozzle 502. This may e.g. be done with a device comprising one or more of an extrusion and/or heating function. Such device is indicated with reference 573 and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in an extrudate 321 downstream of the printer nozzle which becomes a layer 322 on the receiver item or on already deposited printed material. In general, the diameter of the extrudate 321 downstream of the nozzle 502 is reduced relative to the diameter of the filament 322 upstream of the printer head 501. Hence, the printer nozzle is sometimes (also) indicated as extruder nozzle. Arranging layer 322 by layer 322, a 3D item 1 may be formed. Reference 575 indicates the filament providing device, which here amongst others include the spool or roller and the driver wheels, indicated with reference 576.

Reference $A_x$ indicates a longitudinal axis or filament axis or layer axis (of a 3D printed layer).

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Alternatively, or additionally, in embodiments the receiver plate may also be moveable in one or two directions in the x-y plane (horizontal plane). Further, alternatively, or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Reference D indicates the diameter of the nozzle (through which the 3D printable material 201 is forced).

Figure 1B:
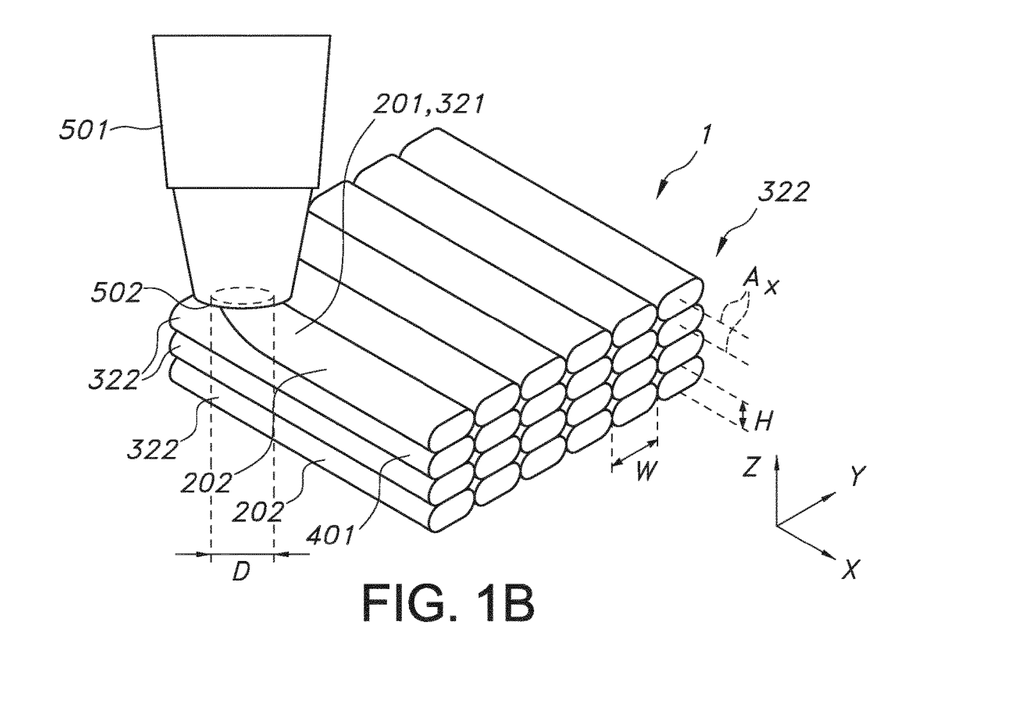

FIG. 1b schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 322. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1a-1b, the first or second printable material or the first or second printed material are indicated with the general indications printable material 201 and printed material 202, respectively. Directly downstream of the nozzle 502, the filament 321 with 3D printable material becomes, when deposited, layer 322 with 3D printed material 202.

Figure 1C:
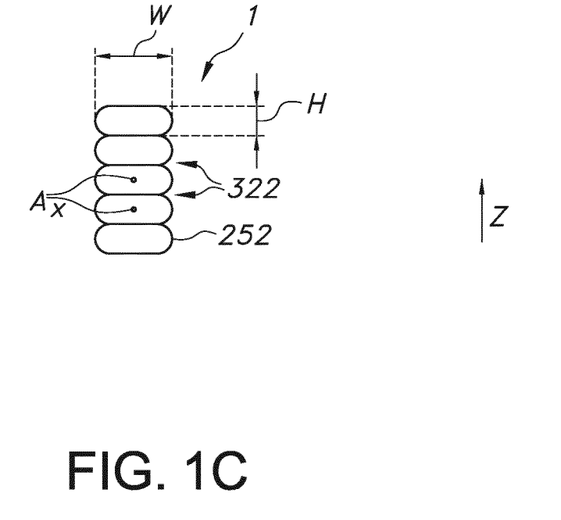

FIG. 1c schematically depicts a stack of 3D printed layers 322, each having a layer height H and a layer width W. Note that in embodiments the layer width and/or layer height may differ for two or more layers 322. Reference 252 in FIG. 1c indicates the item surface of the 3D item (schematically depicted in FIG. 1c).

Referring to FIGS. 1a-1c, the filament of 3D printable material that is deposited leads to a layer having a height H (and width W). Depositing layer 322 after layer 322, the 3D item 1 is generated. FIG. 1c very schematically depicts a single-walled 3D item 1.

Figure 2A:
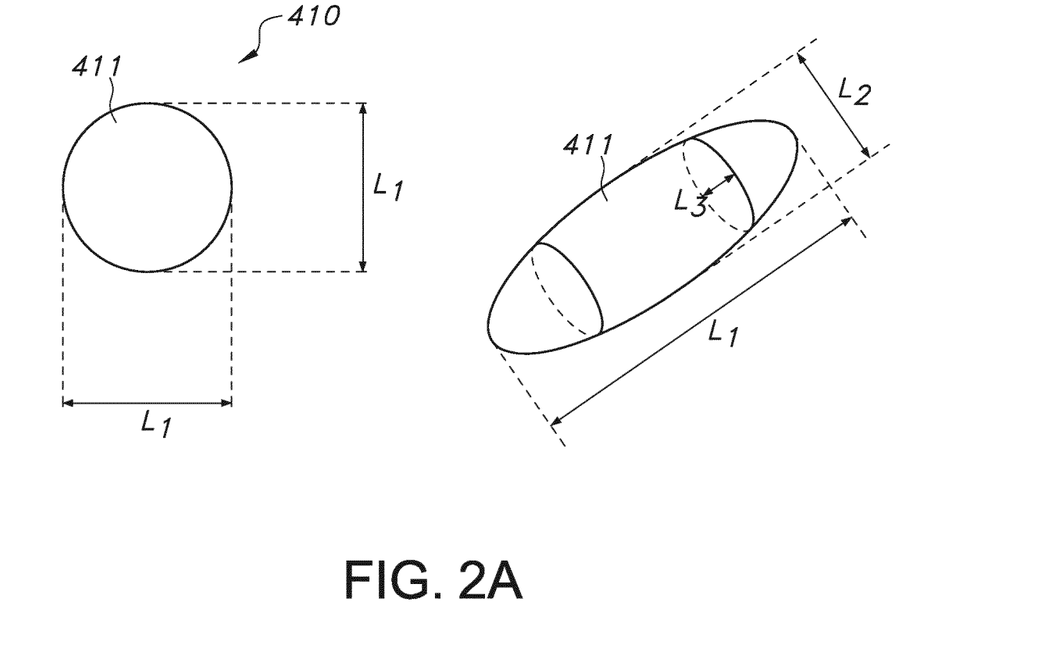
FIGS. 2a-2b schematically depict some aspects of embodiments of porous inorganic particles.

FIG. 2a schematically depicts for the sake of understanding particles and some aspects thereof. The particles 410 have a first dimension or length L1. In the left example, L1 is essentially the diameter of the essentially spherical particle. On the right side a particle is depicted which has non spherical shape, such as an elongated particle 410. Here, by way of example L1 is the particle length. L2 and L3 can be seen as width and height. Of course, the particles may comprise a combination of differently shaped particles.

Figure 2B:
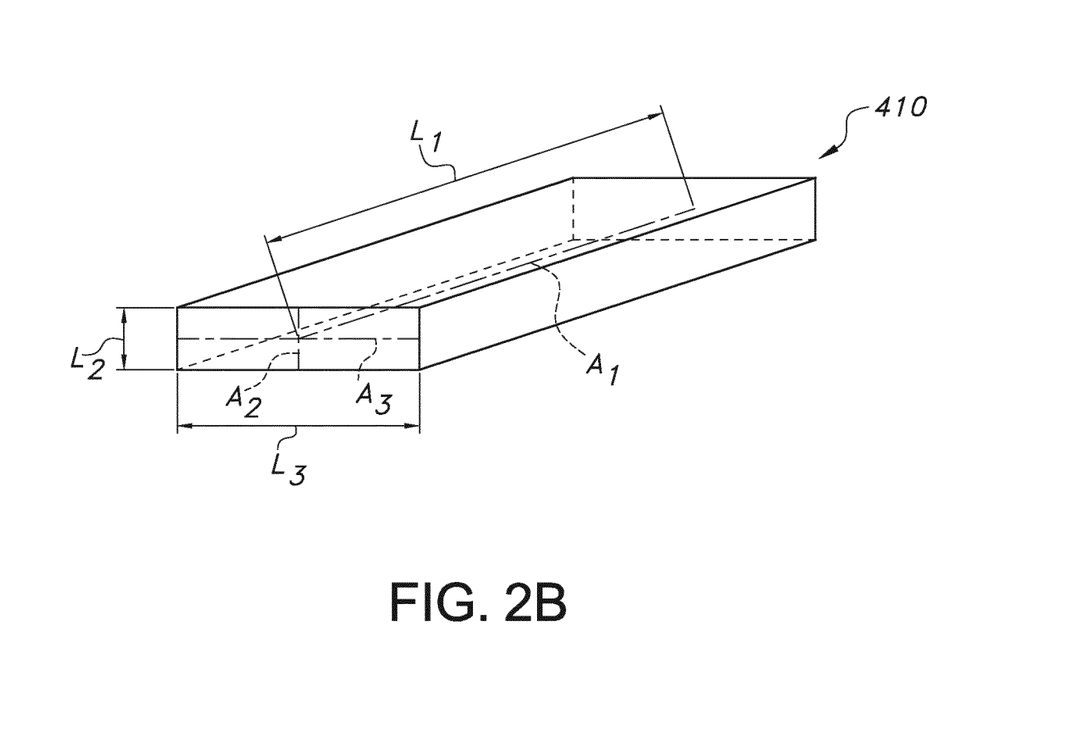

FIG. 2b schematically depicts some aspects of the particles 410. Some particles 410 have a longest dimension A1 having a longest dimension length L1 and a shortest dimension A2 having a shortest dimension length L2. FIG. 2b schematically depicts a particle 410 in 3D, with the particle 410 having a length, height, and width, with the particle essentially having an elongated shape. Hence, the particle may have a further (minor or main) axis, herein indicated as further dimension A3. The relative lengths L1, L2 and L3 in FIG. 2b do not suggest specific aspect ratios; the drawing is used to illustrate some aspects of the invention.

Note that the notations L1, L2, and L3, and A1, A2 and A3 are only used to indicate the axes and their lengths, and that the numbers are only used to distinguish the axis. Further, note that the particles are not essentially oval or rectangular parallelepiped, the particles may have any shape.

Figure 3A:
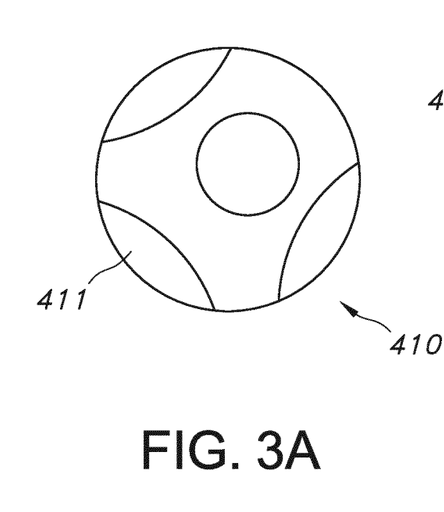
FIGS. 3a-3d schematically depict some further aspects of the invention.
Figure 3B:
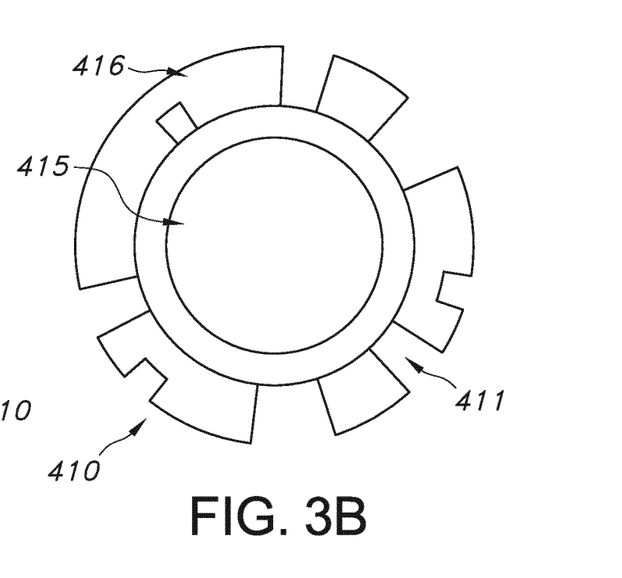

FIGS. 3a-b schematically depict porous inorganic particles (410) with pores 411. FIG. 3b schematically depicts the porous inorganic particle (410) to have a hollow core (415) and porous shell (416).

Figure 3C:
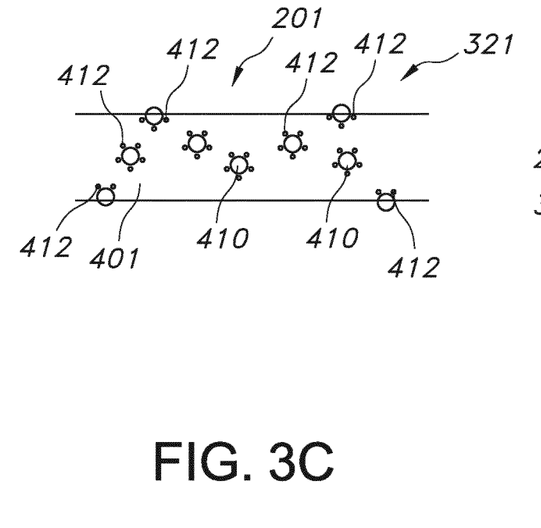

FIG. 3c schematically depicts a filament 321, such as when escaping from a printer nozzle (not depicted), which comprises 3D printable material 201. The 3D printable material comprises thermoplastic material 401 with porous inorganic particles 410 embedded therein, wherein the particles are surrounded by the voids 412.

Figure 3D:
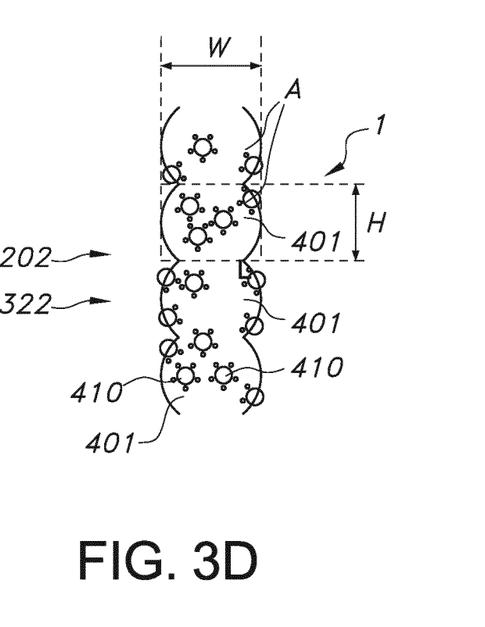

FIG. 3d schematically depicts a 3D item 1, showing the ribbed structures (originating from the deposited filaments), having heights H. This height may also be indicated as width. Here, layers 322 with printed material 202, with heights H and widths W are schematically depicted. FIG. 3b can be seen as a stack of layers 322 of which a plurality adjacent stacks are shown in FIG. 1b. The 3D printed material comprises thermoplastic material 401 with porous inorganic particles 410 embedded therein, wherein the particles are surrounded by the voids 412.

Figure 4A:
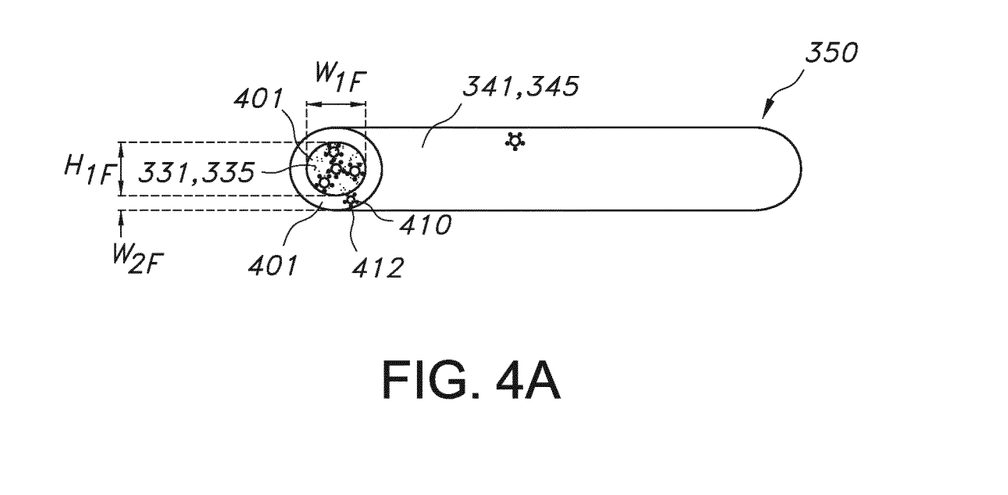
FIGS. 4a-4b schematically depict some aspects and embodiments.

FIG. 4a schematically depicts some further aspects of the method of the invention, wherein a core-shell filament 350 may be used in the method. The filaments 350 may be used in a printer 500, e.g. as depicted in FIG. 1a-1b, having a nozzle 502 with a single opening. The geometry, especially the width of the core W1F, height of the core H1F and the width (or thickness) of the shell W2F in the filaments are indicated. The shell 340 comprising thermoplastic material 401 and optionally also comprising porous inorganic particles 410 completely enclosing the core 330 (comprising thermoplastic material 401 and further comprising porous inorganic particles 410).

Figure 4B:
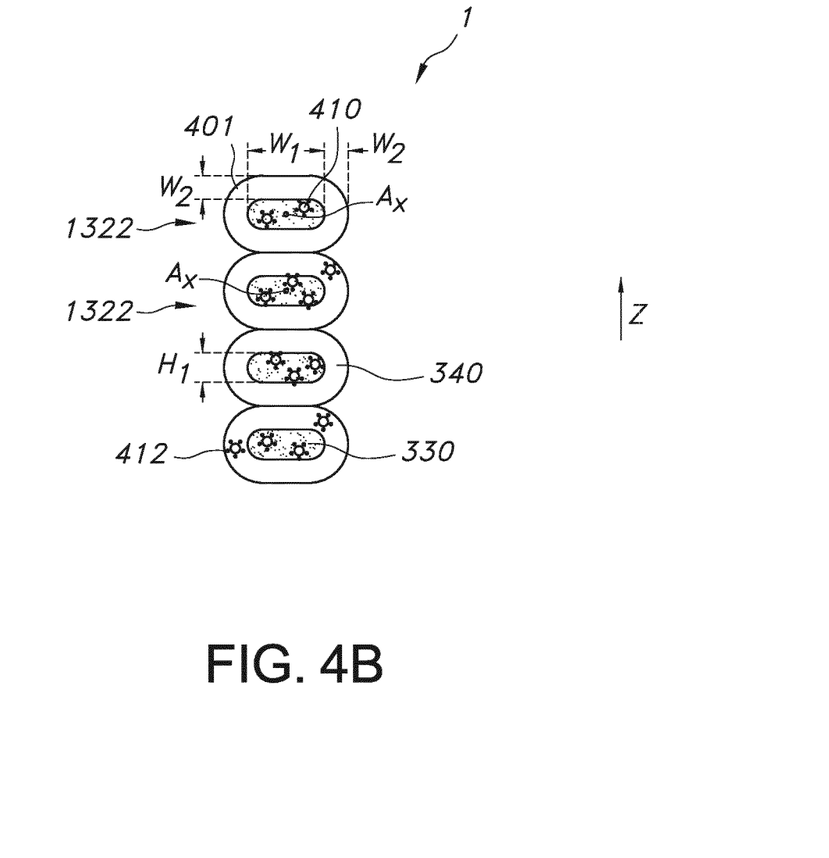

Using the filament 320 of FIG. 4a in the 3D printing stage may in embodiments result in the 3D item 1 depicted in FIG. 4b.

Figure 5:
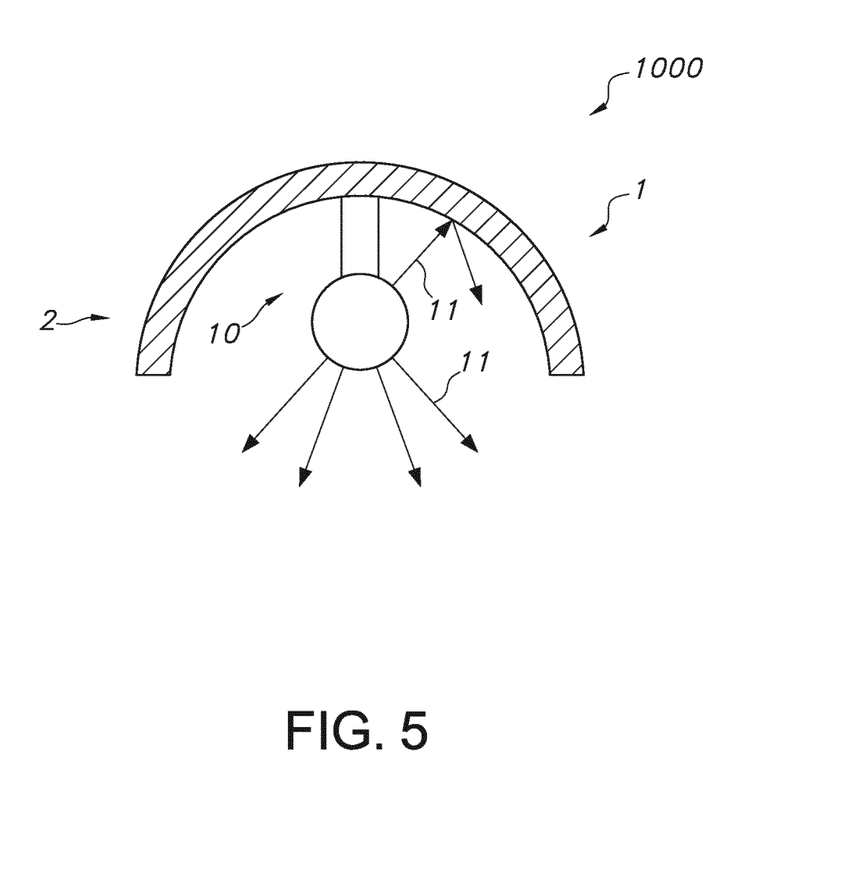
FIG. 5 schematically depicts an application.

FIG. 5 schematically depicts an embodiment of a lamp or luminaire, indicated with reference 2, which comprises a light source 10 for generating light 11. The lamp may comprise a housing or shade or another element, which may comprise or be the 3D printed item 1. Here, the half sphere (in cross-sectional view) schematically indicates a housing or shade. The lamp or luminaire may be or may comprise a lighting device 1000 (which comprises the light source 10). Hence, in specific embodiments the lighting device 1000 comprises the 3D item 1. The 3D item 1 may be configured as one or more of (i) at least part of a lighting device housing, (ii) at least part of a wall of a lighting chamber, and (iii) an optical element. Hence, the 3D item may in embodiments be reflective for light source light 11 and/or transmissive for light source light 11. Here, the 3D item may e.g. be a housing or shade. The housing or shade comprises the item part 400. For possible embodiments of the item part 400, see also above.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in embodiments refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for producing a 3D item by means of fused deposition modelling, the method comprising a 3D printing stage comprising layer-wise depositing 3D printable material, to provide the 3D item comprising 3D printed material, wherein the 3D item comprises layers of 3D printed material, wherein the 3D printable material comprises thermoplastic material, wherein during at least part of the 3D printing stage the 3D printable material further comprises porous inorganic particles embedded in the thermoplastic material, wherein the porosity of the inorganic particles is in the range of 5 to 60 vol. %, and wherein the inorganic particles have an open porosity to allow a controlled introduction of voids in the 3D printable material.

2. The method according to claim 1, wherein the inorganic particles have a length (L1) in the range of 1 to 500 μm, a width (L2) and a height (L3), wherein the aspect ratio AR1=L1/L2 is in the range of 0.5≤AR1≤2, wherein the aspect ratio AR2=L1/L3 is in the range of 0.5≤AR2≤2, and wherein the aspect ratio AR3=L2/L3 is in the range of 0.5≤AR2≤2.

3. The method according to claim 1, wherein the concentration of the porous inorganic particles is in the range of 10 to 30 vol. % relative to the 3D printable material.

4. The method according to claim 1, wherein the porous inorganic particles comprise porous glass particles.

5. The method according to claim 1, wherein the porous inorganic particles comprise core-shell particles, comprising a hollow core and a porous shell.

6. The method according to claim 1, wherein the porous inorganic particles have a first density n1, wherein the thermoplastic material has a second density n2, wherein 0.8≤n1/n2≤1.2.

7. The method according to claim 1, wherein the layer comprises a core-shell layer of 3D printed material, comprising: a core comprising thermoplastic material further comprising porous inorganic particles embedded in the thermoplastic material at a concentration (c1); and a shell comprising thermoplastic material, further comprising porous inorganic particles embedded in the thermoplastic material at a concentration (c2); wherein the shell at least partly encloses the core; wherein the core has a core height and a core width, wherein the shell has a shell width; wherein the 3D printing stage comprises 3D printing the core-shell layer of 3D printed material; wherein c2/c1≤0.5.

8. The method according to claim 1, wherein the porous inorganic particles have pores having an average pore size in the range of 10-100 μm, and wherein the porous inorganic particles are light transmissive and wherein the 3D printable material is light transmissive.

* * * * *